US006536279B1

United States Patent
Berna

(10) Patent No.: US 6,536,279 B1
(45) Date of Patent: Mar. 25, 2003

(54) PROCESS FOR BALANCING A SHAFT WITH AN OSCILLATION DAMPER

(75) Inventor: Otmar Berna, Friedrichshafen (DE)

(73) Assignee: MTU Friedrichshafen GmbH, Friedrichshafen (DE)

(*) Notice: Subject to any disclaimer, the term of this patent is extended or adjusted under 35 U.S.C. 154(b) by 171 days.

(21) Appl. No.: 09/709,412

(22) Filed: Nov. 13, 2000

(30) Foreign Application Priority Data

Nov. 12, 1999 (DE) .......................... 199 54 475

(51) Int. Cl.[7] .............................................. G01M 1/22
(52) U.S. Cl. ............................... 73/462; 73/460; 73/465
(58) Field of Search .......................... 73/462, 458, 460, 73/465, 66

(56) References Cited

U.S. PATENT DOCUMENTS

| | | | | |
|---|---|---|---|---|
| 3,910,121 A | * | 10/1975 | Curchod et al. ............... 73/462 |
| 4,002,076 A | * | 1/1977 | Brunnengraber ............. 73/462 |
| 4,262,977 A | * | 4/1981 | Bock ........................... 384/202 |
| 4,352,291 A | * | 10/1982 | Curchod et al. ............... 73/462 |
| 4,608,867 A | * | 9/1986 | Iliev ........................... 73/462 |
| 5,131,143 A | * | 7/1992 | Kirchberger ............. 29/888.08 |
| 5,329,814 A | * | 7/1994 | Betz et al. .................... 73/462 |
| 5,421,199 A | * | 6/1995 | Himmler ..................... 73/462 |
| 5,661,672 A | * | 8/1997 | Gnieka et al. ............... 702/190 |
| 5,724,271 A | * | 3/1998 | Bankert et al. ............... 73/462 |

FOREIGN PATENT DOCUMENTS

| | | |
|---|---|---|
| DE | 25 08 212 | 2/1975 |
| DE | 25 34 684 | 8/1975 |
| DE | 27 44 040 A1 | 9/1977 |
| DE | 41 20 197 A1 | 6/1991 |
| EP | 0 466 684 A2 | 7/1991 |

* cited by examiner

Primary Examiner—Hezron Williams
Assistant Examiner—Jacques Saint-Surin
(74) Attorney, Agent, or Firm—Crowell & Moring LLP

(57) ABSTRACT

A process for balancing a shaft, particularly a cardan shaft with an attached oscillation damper is shown. The oscillation damper consists of a hub attached to the shaft, a damper ring lying concentric to same, and elements elastically attached to the hub and damping ring. The imbalance of the entire system is determined on a balancing machine, and the radial runout of the damping ring is measured in parallel to same. An imbalance corresponding to the imbalance of the damping ring is determined from the radial runout, and the imbalance of the shaft without the damping ring is determined by calculation of the difference between the total imbalance and the imbalance of the damping ring. The balancing process according to the invention lowers production costs by reduction of processing time during balancing. At the same time, an improvement in function and an increase in service life of the oscillation damper is achieved.

14 Claims, 2 Drawing Sheets

PROCESS FOR BALANCING A SHAFT WITH AN OSCILLATION DAMPER

BACKGROUND AND SUMMARY OF THE INVENTION

This application claims the priority of German Patent Document 199 54 475.1, filed Nov. 12, 1999, the disclosure of which is expressly incorporated by reference herein.

This invention relates to a process for balancing a shaft, particularly a cardan shaft with an attached oscillation damper. Processes are known in which the imbalances of rotors, also represented by rotating shafts, are eliminated by balancing. For balancing, the shaft is set in rotation on a balancing machine, and the size and position of the imbalance is indicated. Excess mass is removed at specific locations by boring, or weights are attached to the location opposite the imbalance to compensate.

A process for balancing two shafts attached to each other is described in German Patent Document DE 41 20 197 A1. The balancing of the unit as a whole is not hereby attempted. Instead, the radial runout of the first shaft, namely a transmission output shaft, is determined and compensating weight is determined by calculation, taking into account the relevant total rotor mass including all of the rotor masses attached to the shafts, and attached. The second shaft, a cardan shaft coupled with the transmission output shaft, can also be balanced separately. Any remaining residual imbalance of the cardan shaft is marked and both shafts are then assembled in such a way that the residual imbalance of the cardan shaft lies opposite the radial runout of the driven shaft.

When balancing a cardan shaft with an oscillation damper, the usual method of proceeding is to balance the cardan shaft as completely as possible, specifically with coupling and union elements mounted, but without the oscillation damper, and then attach appropriate mass compensation weights. Subsequently, the complete cardan shaft, including the oscillation damper and further coupling and union elements which are only mountable together with the oscillation damper, is balanced in three balancing planes, whereby mass is bored out of a damper ring of the oscillation damper in order to equalize the mass. The disadvantage of proceeding in this way is that two working cycles are required for balancing, which represents a large expense. It is further disadvantageous that, in order to complete the cardan shaft, additional necessary components for establishing the connection with a driveshaft are mounted on the oscillation damper, such as flexible disks and union elements of a coupling. The imbalance of these additional components is added to the damping ring of the oscillation damper, which does not produce an optimal damping function.

An oscillation damper as used for oscillation damping in the drivetrains of vehicles is, described in German Patent Document DE-AS 25 08 212, corresponding to U.S. Pat. No. 4,077,233 or DE-OS 25 34 684, corresponding to U.S. Pat. No. 4,114,472.

The invention specified in a first embodiment has as its basis the problem of minimizing production costs by reduction of processing time for balancing, as well as attaining an improvement of function and an increase of the service life of the oscillation damper.

This problem is solved by providing an attached oscillation damper including hub attached to the shaft, a damping ring lying concentric to the hub, and elastic elements elastically attached to both the hub and the damping ring, determining an imbalance of the assembly including the shaft and the oscillation damper in regard to size and relative position in at least one plane, measuring a radial runout of the damping ring in parallel to the assembly imbalance, calculating an imbalance of the damping ring corresponding to the radial runout taking geometrical and material data of the damping ring as a basis, determining an imbalance of the shaft without the damping ring by calculation of a difference between the imbalance of the assembly and the imbalance of the damping ring, and performing a mass compensation corresponding to position and size of the damping ring and the imbalance of the shaft on the shaft and the damping ring. The cycle time for balancing is shortened by determining the imbalance of the cardan shaft and the damping ring of the oscillation damper in one working cycle, whereby the imbalance of the entire system, including of the cardan shaft with add-on parts and oscillation damper, is determined in the usual way through balancing, and the imbalance of the damper ring is determined through concentricity measurement. The proportional imbalance of the cardan shaft with fixed masses attached to it is the difference between the imbalance of the entire system and the imbalance of the damping ring. The calculation operations required are undertaken for practical purposes by the balancing machine, which is equipped with the appropriate software. An improvement of the balancing quality thereby results in that the cardan shaft is assembled completely with all add-on parts and an exact separation of the imbalances resulting from the damping ring and those from the cardan shaft with add-on parts is thereby possible.

Thereby an improvement of the function of the damper naturally also results. In addition, its service life will be increased, as its elastic elements are stressed less due to the lower forces.

Other objects, advantages and novel features of the present invention will become apparent from the following detailed description of the invention when considered in conjunction with the accompanying drawings.

DETAILED DESCRIPTION OF THE DRAWINGS

Figure 1:
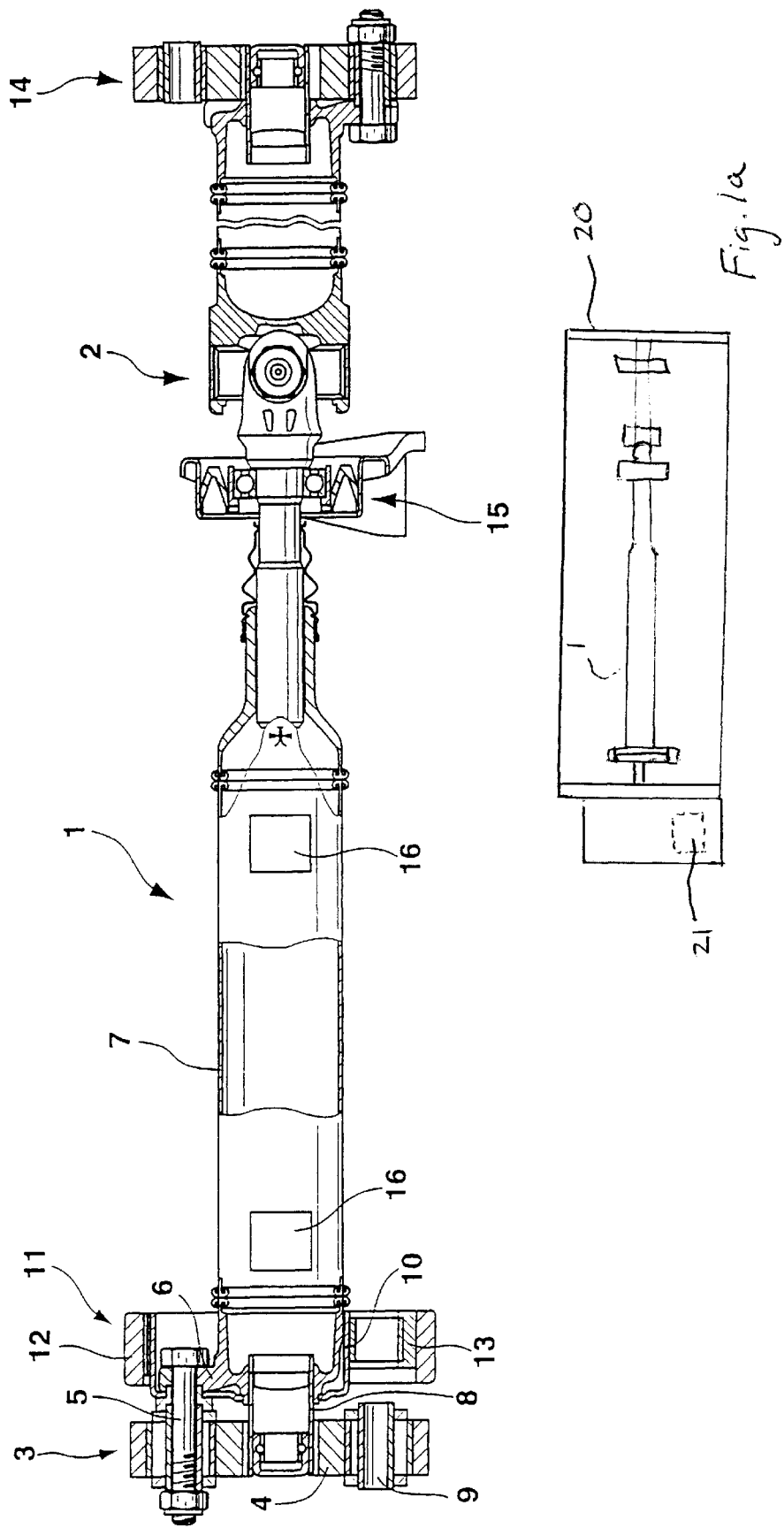
FIG. 1 is a longitudinal sectional view of a cardan shaft with attached oscillation damper, constructed according to a preferred embodiment of the invention.
Figure 2:
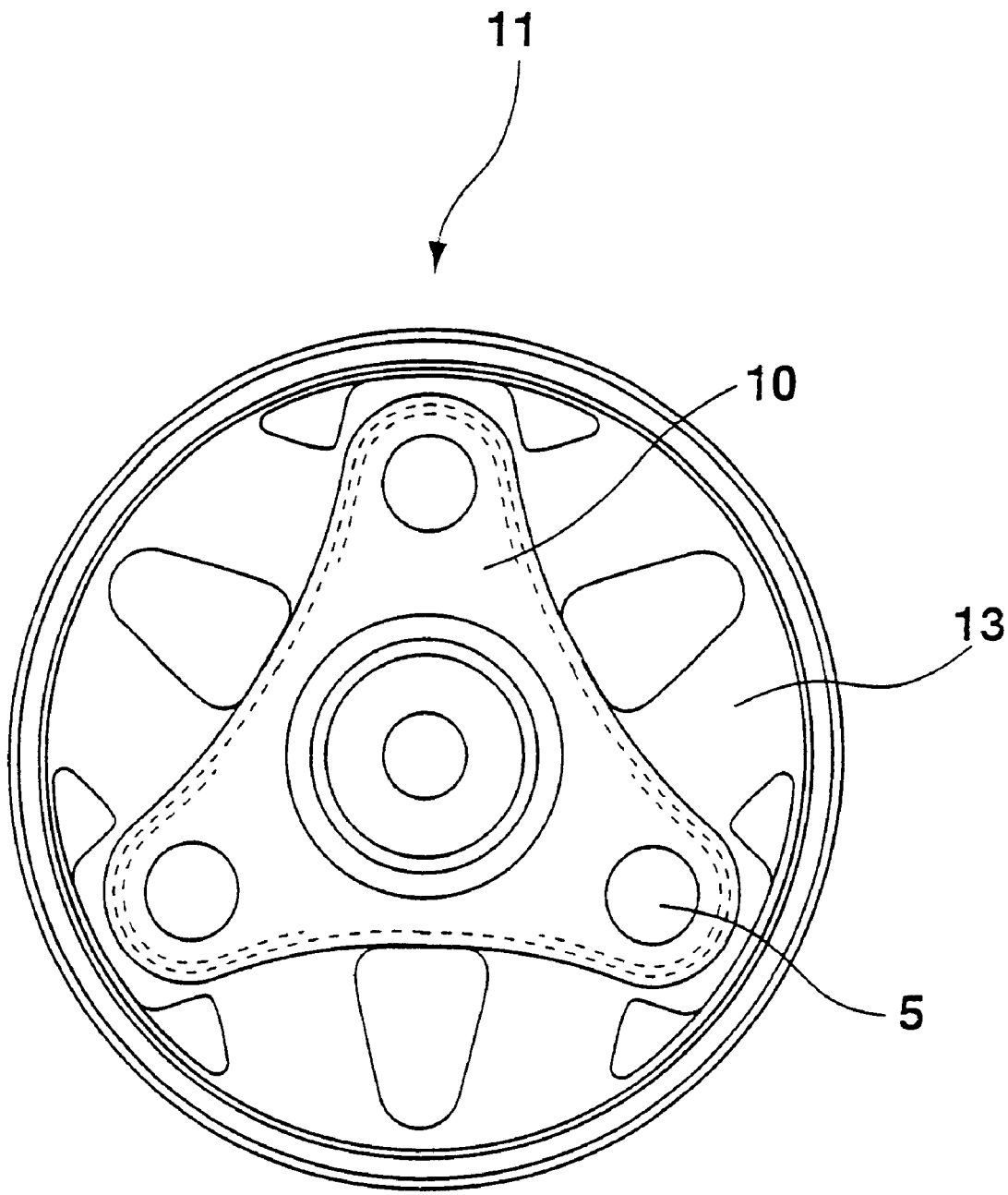
FIG. 2 is a view of the oscillation damper of the FIG. 1 arrangement.

In FIG. 1, two cardan shaft sections of a cardan shaft 1 connected to one another through a universal joint 2 are depicted, whereby a cardan shaft section depicted in its complete length is connected via an elastic coupling 3 with a transmission output shaft (not shown) of an internal combustion engine (also not shown). The elastic coupling 3 includes a flexible disk 4 attached via screws 5 to an attachment flange 6 of a cardan shaft housing 7 of the cardan shaft 1. The transmission output shaft engages in a centering sleeve 8 with a pin. The connection of the transmission output shaft with the flexible disk 4 occurs via a three-star flange (not shown), which is attached to the flexible disk 4 via screws (not shown) positioned in screw through-holes 9. The hub 10 of an oscillation damper 11 is attached to the cardan shaft 1 with the same screws 5 with which the coupling 3 is also attached to the attachment flange 6 of the cardan shaft 1. The damping mass of the oscillation damper 11 is formed by an outer damping ring 12 positioned concentric to the hub 10. Between the cylindrical internal circumference of the damping ring 12 and the external circumference of the hub 10 lying concentric to the damping ring 12, there are elastic elements 13, essentially including of three segmented bodies due to the triangular shape of the hub 10. A view of the oscillation damper 11 is depicted in FIG. 2. The damping ring 12 makes radial compensation movements in relation to the hub 10 to damp cyclic irregularities.

The hub 10 includes a radial attachment flange and an edge, bent axially, extending towards the circumference and attached to the elastic elements 13.

The balancing process according to the invention proceeds as follows:

The cardan shaft 1 is completely assembled. A complete cardan shaft includes the first section with attached oscillation damper 11, depicted in FIG. 1, and the coupling 3 with union attached at the same point, as well as a further cardan shaft section (shown incompletely lengthwise) over the universal joint 2 connected with the coupling 14 at the end opposite to the universal joint 2. The cardan shaft completed in this way, which is journalled on the bearing 15 in the region of the universal joint 2, is now set in rotation on a balancing machine (20) and dynamically balanced in three radial planes at a rotational speed of approximately 3000 rpm, whereby one radial plane lies in the range of the oscillation damper 11. During the rotation, the rate and relative position of the total imbalance is recorded by the balancing machine 20. The radial runout on the damping ring 12 is measured parallel to this. The measurement of the radial runout occurs, for example, by means of a laser measurement device or by means of an inductive measurement system. If the geometry and material of the damping ring 12 is known, the damping ring imbalance can be calculated from the measurement result of the radial runout according to the following equation:

$$\overline{U_T} = M_T * \overline{e} [gmm]$$

$\overline{U_T}$=imbalance–damping ring
$\overline{e}$=eccentricity of the damping ring
$M_T$=damping ring mass For this purpose, the calculation algorithm is contained in the software 21 of the balancing machine 20. On the basis of the calculation result for the damping ring imbalance, the machine shows the relative position and the masses to be bored out, in that the number, location, and depth of the bores is indicated. The software 21 of the balancing machine 20 further allows the difference between the total imbalance and the imbalance determined for the damping mass to be determined, and calculates from same the imbalance of the cardan shaft 1 and the components rigidly attached to the cardan shaft, without the damping ring 11, in regard to position and mass to be attached, marked by defined regions in which metal sheets 16 for balancing are positioned. The equation of calculation is:

$$\overline{U_g} = \overline{U_G} - \overline{U_T}$$

$\overline{U_g}$=imbalance of the cardan shaft+add-on parts
$\overline{U_G}$=total imbalance
$\overline{U_T}$=damping ring imbalance The balancing is finished after boring out the masses on the oscillation damper 11 and attaching the compensating masses on the cardan shaft 1.

The balancing process according to the invention leads to a reduction in costs by decreasing the cycle time, as the determination of the imbalance of the shaft and damping ring occurs in one working cycle for a completely assembled cardan shaft. An improvement of function of the damper occurs in that the elastic coupling 3 is included in the balancing process for a cardan shaft assembled completely with the damping ring 12 and the imbalance of the damping ring 12 is thereby not distorted. In normal balancing processes, in which the cardan shaft is done in a first working cycle without the oscillation damper and thereby also without the connected elastic coupling, and only in the second cycle is the elastic coupling with the oscillation damper attached, the imbalance of the coupling is added to that of the damping ring. Due to the improvement in quality through exact balancing, an improvement in service life results, as smaller forces arise in the elastic elements due to the exact balancing of the damping ring. In addition, the oscillation damper is in a position to maintain the desired frequencies better, representing an improvement in function.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for balancing a shaft where a shaft assembly includes the shaft with an attached oscillation damper including a hub attached to the shaft, a damping ring lying concentric to the hub, and elastic elements elastically attached to both the hub and the damping ring, the process comprising:
   determining by rotation an imbalance of the shaft assembly including the shaft and the oscillation damper in regard to size and relative position in at least one radial plane,
   measuring a radial runout of the damping ring in parallel to the imbalance of the shaft assembly,
   calculating an imbalance of the damping ring corresponding to the radial runout using geometrical and material data of the damping ring as a basis,
   determining an imbalance of the shaft assembly without the damping ring by calculation of a difference between the imbalance of the assembly and the imbalance of the damping ring, and
   performing a mass compensation corresponding to position and size of the imbalance of the damping ring on the damping ring and the imbalance of the shaft assembly without the damping ring.

2. Process according to claim 1, wherein the mass compensation on the damping ring is performed by removing rotor mass.

3. Process according to claim 1, wherein the rotation speed is approximately 3000 rpm.

4. Process according to claim 1, wherein the balancing is performed in three radial planes.

5. Process according to claim 4, wherein at least one plane of the three radial planes lies in a range of the oscillation damper.

6. Process according to claim 1, wherein the shaft assembly includes flexible disks and screws of couplings during balancing.

7. Process according to claim 6, wherein the determining of the imbalance of the shaft assembly without the damping ring is assigned to the software of the balancing machine.

8. Process according to claim 1, wherein the calculating of the imbalance of the damping ring is assigned to software of a balancing machine.

9. Process according to claim 1, wherein the determining of the imbalance of the shaft is assigned to software of a balancing machine.

10. Process for balancing a shaft assembly, said assembly including a shaft with an attached oscillation damper including a hub attached to the shaft, a damping ring concentric with the hub and elastic elements elastically attached to the hub and the damping ring, comprising:

determining an imbalance of the shaft assembly in at least one plane;

determining a radial runout of the damping ring in parallel to the imbalance of the shaft assembly;

calculating an imbalance of the damping ring corresponding to the radial runout;

determining an imbalance of the shaft assembly without the damping ring by a difference between the imbalance of the shaft assembly and the imbalance of the damping ring;

performing a mass compensation on the shaft corresponding to position and size of the imbalance of the assembly without the damping ring; and performing a mass compensation on the damping ring corresponding to position and size of the imbalance of the damping ring.

11. Process according to claim 10, wherein the shaft assembly also includes flexible disks and elements of couplings.

12. Process according to claim 10, wherein the determining of the imbalance of the shaft assembly, the imbalance of the damping ring and the imbalance of the assembly without damping ring is assigned to software of a balance machine.

13. Process of balancing a shaft including rigidly attached components, and a damping mass, the process comprising:

rotating the shaft on a balancing machine;

determining an imbalance of the shaft in at least one plane;

calculating an imbalance of the damping mass;

calculating an imbalance of the shaft without the damping mass;

performing a mass compensation corresponding to position and size of the imbalance of the damping mass on the damping mass; and performing a mass compensation corresponding to position and size of the imbalance of the shaft without the damping mass on the shaft.

14. Method of making a balanced shaft assembly comprising:

providing a shaft assembly including a shaft with an attached oscillation damper, a hub attached to the shaft, a damping ring lying concentric to the hub, and elastic elements elastically attached to both the hub and the damping ring, determining by rotation an imbalance of the shaft assembly including the shaft and the oscillation damper in regard to size and relative position in at least one radial plane, measuring a radial runout of the damping ring in parallel to the imbalance of the shaft assembly, calculating an imbalance of the damping ring corresponding to the radial runout using geometrical and material data of the damping ring as a basis, determining an imbalance of the shaft assembly without the damping ring by calculation of a difference between the imbalance of the assembly and the imbalance of the damping ring, and performing a mass compensation corresponding to position and size of the imbalance of the damping ring on the damping ring and the imbalance of the shaft assembly without the damping ring.

* * * * *